US012644757B2

(12) United States Patent
Hagan et al.

(10) Patent No.: US 12,644,757 B2
(45) Date of Patent: Jun. 2, 2026

(54) MIXER DRUM LOAD DETECTION SYSTEM

(71) Applicants: Chris Hagan, Farmers Branch, TX (US); Greg Radighieri, Sunnyvale, TX (US)

(72) Inventors: Chris Hagan, Farmers Branch, TX (US); Greg Radighieri, Sunnyvale, TX (US)

(73) Assignee: The Vince Hagan Company, Sunnyvale, TX (US)

( * ) Notice: Subject to any disclaimer, the term of this patent is extended or adjusted under 35 U.S.C. 154(b) by 573 days.

(21) Appl. No.: 17/973,668

(22) Filed: Oct. 26, 2022

(65) Prior Publication Data

US 2023/0128552 A1 Apr. 27, 2023

Related U.S. Application Data

(60) Provisional application No. 63/271,868, filed on Oct. 26, 2021.

(51) Int. Cl.
| | |
|---|---|
| G01G 19/52 | (2006.01) |
| B28C 5/20 | (2006.01) |
| B28C 7/02 | (2006.01) |

(52) U.S. Cl.
CPC ........... G01G 19/52 (2013.01); B28C 5/2054 (2013.01); B28C 7/022 (2013.01)

(58) Field of Classification Search
CPC ........ G01N 11/00; G01G 19/52; G01G 23/16; B28C 5/2054; B28C 7/022; B28C 5/2045; B28C 5/422; B28C 5/4265; B28C 7/026

USPC .............................................................. 177/1
See application file for complete search history.

(56) References Cited

U.S. PATENT DOCUMENTS

| | | | | |
|---|---|---|---|---|
| 2,342,749 | A | * | 2/1944 | Maxon, Jr. ............. G01N 11/00 73/54.03 |
| 5,752,768 | A | | 5/1998 | Assh |
| 6,042,258 | A | | 3/2000 | Hines et al. |
| 6,042,259 | A | | 3/2000 | Hines et al. |
| 6,123,444 | A | | 9/2000 | Silbernagel et al. |
| 8,020,431 | B2 | | 9/2011 | Cooley et al. |
| 8,118,473 | B2 | | 2/2012 | Compton et al. |
| 10,363,684 | B2 | | 7/2019 | Roberts et al. |
| 2015/0355160 | A1 | * | 12/2015 | Berman ............... G01N 27/048 73/54.03 |

FOREIGN PATENT DOCUMENTS

| | | | |
|---|---|---|---|
| GB | 2392502 A | | 3/2004 |
| JP | 2019195932 A | * | 11/2019 |

* cited by examiner

*Primary Examiner* — Peter J Macchiarolo
*Assistant Examiner* — Mireille S Sadate-Moualeu

(57) ABSTRACT

A load measurement system for a mixer comprising a mixing drum configured to contain and mix concrete, a cradle adjacent to the mixing drum and configured to receive the mixing drum, and a load measurement device adjacent to the cradle and configured to determine the changes to a material property of the cradle due to the force exerted on the cradle by the load in the mixing drum. The load measurement system determines the amount of the load of concrete in the mixing drum based on the measured change to the material property of the cradle, which may include one or more of a material deformation, displacement, stress, strain, or the vibration of the cradle.

15 Claims, 7 Drawing Sheets

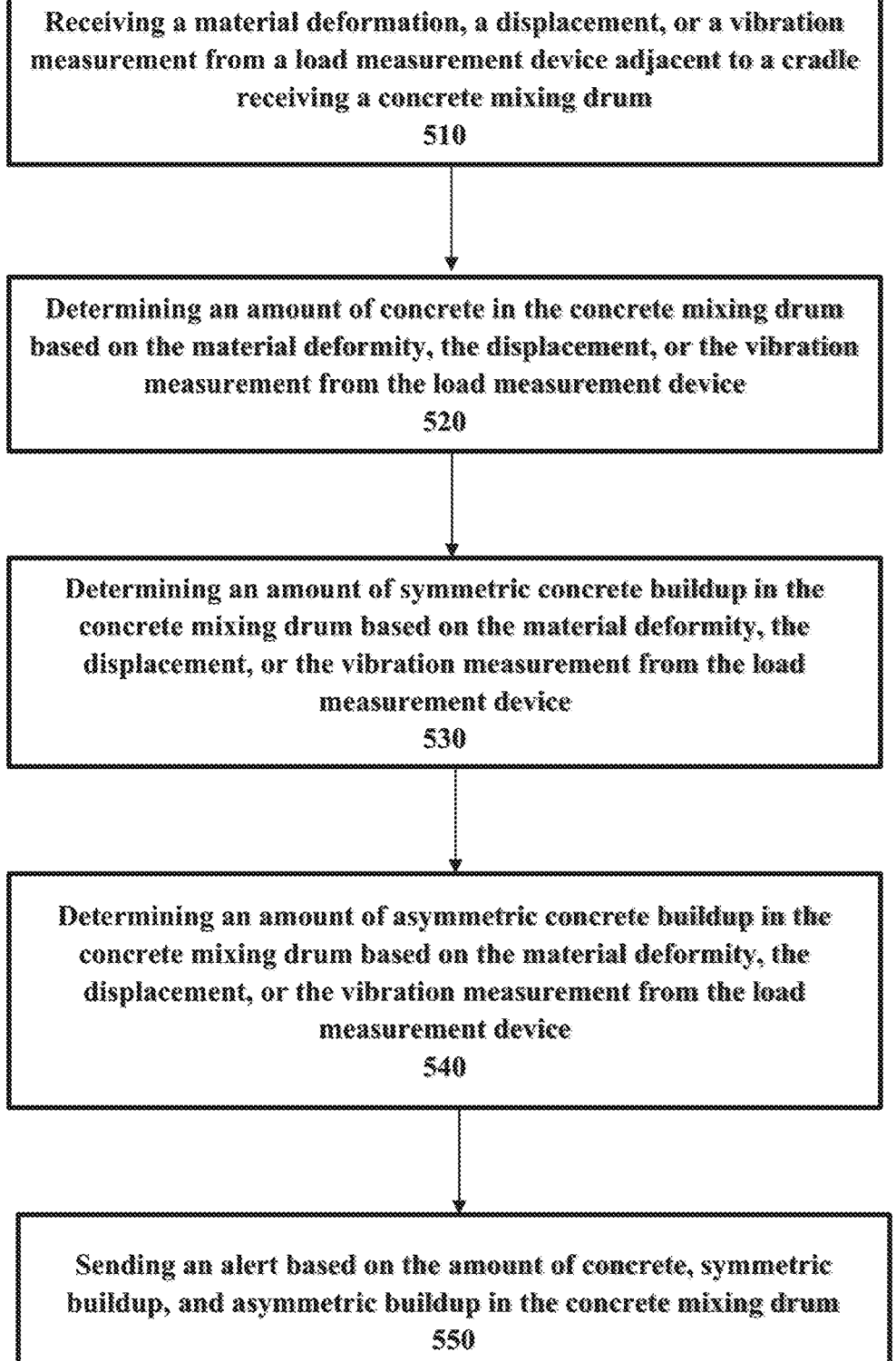

Receiving a material deformation, a displacement, or a vibration measurement from a load measurement device adjacent to a cradle receiving a concrete mixing drum
510

Determining an amount of concrete in the concrete mixing drum based on the material deformity, the displacement, or the vibration measurement from the load measurement device
520

Determining an amount of symmetric concrete buildup in the concrete mixing drum based on the material deformity, the displacement, or the vibration measurement from the load measurement device
530

Determining an amount of asymmetric concrete buildup in the concrete mixing drum based on the material deformity, the displacement, or the vibration measurement from the load measurement device
540

Sending an alert based on the amount of concrete, symmetric buildup, and asymmetric buildup in the concrete mixing drum
550

FIG. 5

MIXER DRUM LOAD DETECTION SYSTEM

CROSS REFERENCE TO RELATED APPLICATIONS

This application claims the benefit of priority under 35 U.S.C. § 119(e) to U.S. Provisional Patent Application No. 63/271,868, filed Oct. 26, 2021, which is incorporated herein by reference.

TECHNICAL FIELD

The present invention generally relates to concrete mixers and determining the amount of concrete contained in the mixer. More specifically, the present invention relates to indirectly determining the amount of concrete in a mixer based on measurements pertaining to a change to a material property of a cradle receiving the mixing drum of the mixer.

BACKGROUND

Concrete batch plants are used in the preparation of concrete. Batch plants may be stationary in nature or portable in nature. Dry concrete ingredients including concrete, aggregates, and admixtures for modifying the properties of the concrete, are measured and apportioned by the batch plants. The dry concrete ingredients and water are loaded into the mixing drum of the batch plant or other stationary or portable mixer, which is rotated to mix the ingredients to form concrete. If the concrete is to be transported, the concrete may be loaded into the mixing drum of a delivery truck and may be mixed therein or it may have been mixed in advance.

Hines et al. taught that the amount of admixture to be dosed into a mixer drum of a delivery truck returning from delivery can be calculated based on the remaining load size and temperature of the concrete (see U.S. Pat. No. 6,042, 258) and that admixture dosing could be done on an automated basis (see U.S. Pat. No. 6,042,259).

Some in the industry believe that prior art methods for calculating the concrete load remaining in the mixer drum after delivery are neither sufficiently accurate nor practically convenient. See U.S. Pat. No. 10,363,684. For example, it is known to weigh a delivery truck on a weight scale before and after delivery of concrete (see, e.g., U.S. Pat. Nos. 5,752,768; 6,123,444; 8,020,431; and GB 2392502), but weight can vary due to imprecision of the scale and various other factors, such as fluctuation of fuel tank and other fluid tank levels. It is also known to estimate concrete discharged from the drum by counting mixing drum rotations required to discharge a known volume of concrete (see, e.g., U.S. Pat. Nos. 5,752,768; 8,020,431; 8,118,473). It also known to calculate the concrete load size by using sensors to determine the load size of concrete by sensing the number of mixing drum rotations to discharge the concrete and the rate of discharge. See U.S. Pat. No. 10,363,684.

The present inventors believe there is a need to be able to determine the amount of concrete in mixing drums at all times, not just after delivery. For instance, knowing the concrete load at all times allows remote users to determine whether a user is cleaning out the concrete mixer overnight or between batches.

The present inventors also believe there is a need to determine the yards of concrete in the drum, uniform drum buildup, and lopsided drum buildup at all times. Having ready access to these calculations could offer improved quality of concrete, as well as improved equipment care and maintenance.

As such, a need exists in the industry for a load measurement system operable to indirectly calculate (rather than directly weigh the load in the drum) the amount of concrete currently in a concrete mixer.

SUMMARY

In one embodiment, the invention comprises a system for determining the amount of concrete currently in a concrete mixing drum based on measurements pertaining to the strain and/or displacement, of a cradle receiving a drum of the concrete mixer.

In another embodiment, the invention comprises a method for indirectly determining the amount of concrete currently in a concrete mixer based on measurements pertaining to the strain and/or displacement of a cradle receiving a drum of the concrete mixer.

In a further embodiment, the method comprises a method for managing a mixing drum that includes sending alerts based on measurements pertaining to the strain and/or displacement of a cradle receiving a drum of the concrete mixer.

BRIEF DESCRIPTION OF THE DRAWINGS

FIG. 5 illustrates a block diagram of a method for sending alerts based on the amount of concrete, symmetric concrete buildup, and asymmetric concrete buildup in the drum;

Figures 1A, 1B:
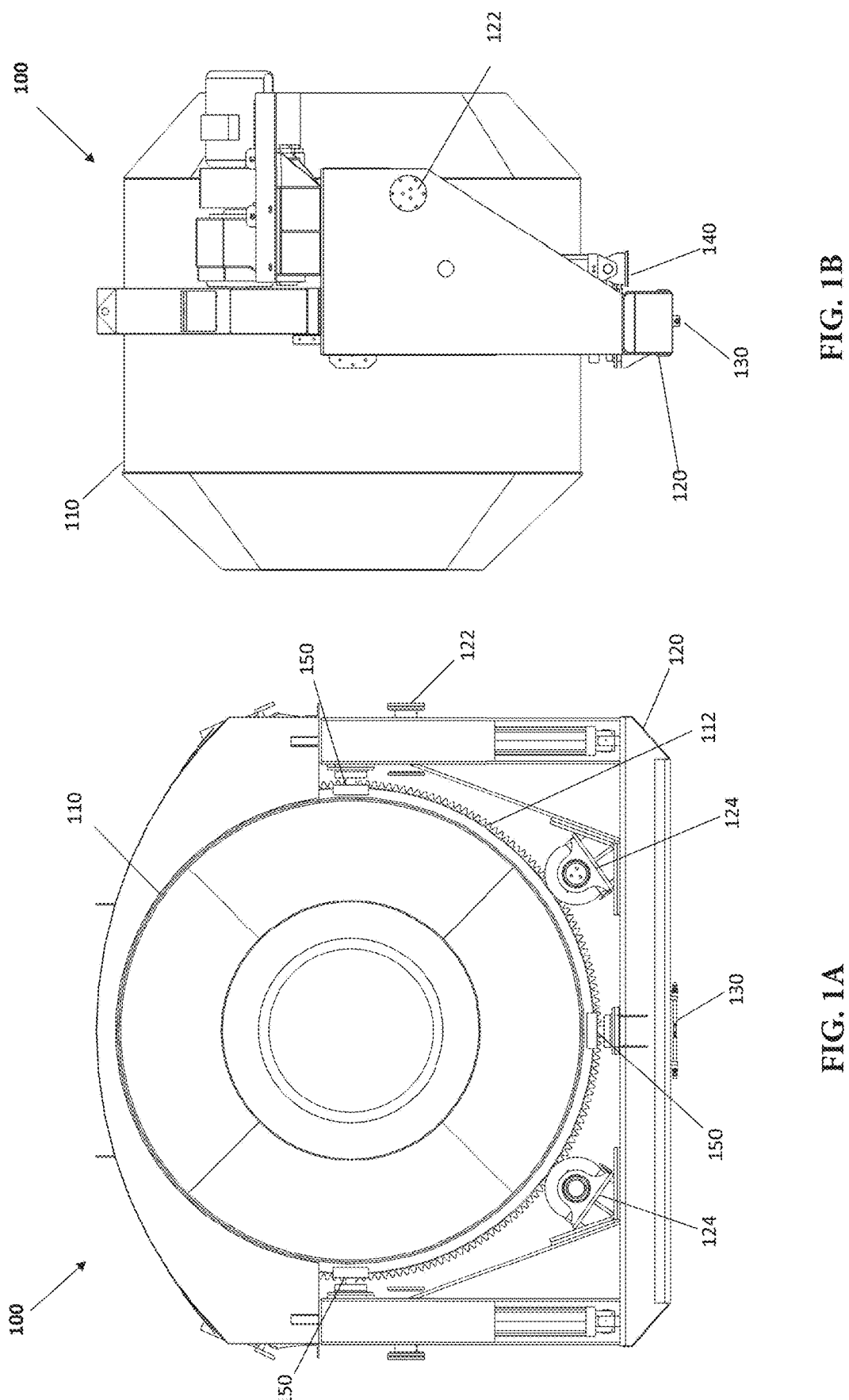
FIGS. 1A and 1B illustrate a perspective and side view of an embodiment of a load measurement system.

Repeat use of reference characters in the present specification and drawings is intended to represent the same or analogous features or elements of the present subject matter.

DETAILED DESCRIPTION

Embodiments of the present invention are further described in detail below with reference to the accompanying drawings and embodiments. The following examples are intended to illustrate the invention, but are not intended to limit the scope of the invention.

"Concrete" as used herein will be understood to refer to materials including a cement binder, water, aggregates (such as sand, crushed gravel or stones), and/or admixtures (such as plasticizers, stabilizers, water-reducing agents, set retarders, set accelerators, air entrainers, air detrainers, strength enhancers, pigments, colorants, fibers for plastic shrinkage control or structural reinforcement, and the like).

"Mixing drum" as used herein will be understood to refer to a drum that is mounted for rotation on a mixer, such as may be found in a mixing plant or on a delivery vehicle. A mixing drum typically has at least one mixing blade attached to the inner surface so that it rotates along with the mixing drum and serves to mix the concrete. The mixing drum can be used to mix concrete as well as for other mixtures, such as asphalt and the like. Examples of such mixing drums may include drum mixers, tilt mixers, non-tilting mixers, reversing drum mixers, batch plants, mixing plants, and the like. The mixing drum may be mounted on a stationary or portable mixer. A portable mixing drum may be mounted a delivery vehicle, trailer, skid, portable wheeled frame, portable stationary-legged frame, or the like.

"Delivery vehicle" as used herein means any vehicle used in the construction industry that can be modified or constructed to incorporate an operable mixing drum such that the delivery vehicle can serve as a mobile mixing device. As used herein construction vehicles can include, but are not limited to, flatbed trucks, dump trucks, cement mixer trucks, or the like.

Referring to FIGS. 1A and 1B, a perspective and a side view of an embodiment of a load measurement system is illustrated. A load measurement system 100 for a mixer comprises a mixing drum 110 configured to contain and mix concrete, a cradle 120 adjacent to the mixing drum 110 and configured to receive the mixing drum 110, and a load measurement device 130 adjacent to the cradle 120. The load measurement system 100 is configured to determine the amount of a load of concrete in the mixing drum 110 by measuring the changes to the material properties of the cradle 120 due to the forces exerted on the cradle 120 by the load within the mixing drum 110. The measured changes to the material properties of the cradle 120 may include one or more of material deformation, displacement, stress, strain, or vibration.

The cradle 120 is substantially U-shaped and operable to receive the drum 110. The cradle 120 may be attached to a stationary, fixed stand, or portable stand such as may be used by a delivery vehicle or other portable frame.

The cradle 120 comprises a cradle pivot 122 and rollers 124. The cradle pivot 122 attaches to the fixed stand or trailer stand. The cradle pivot 122 stabilizes the cradle 120 while a tilting cylinder 140, also connected at one end to the fixed stand or trailer stand, employs hydraulic power to lift or tilt the cradle 120 about the cradle pivot 122. The rollers 124 are located between the cradle 120 and the drum 110. The rollers 124 facilitate the rotation of the drum 110.

The drum 110 is adjacent to the rollers 124 and is received within the U-shaped cradle 120. The drum 110 further comprises a drum ring 112 that is welded to the outside of the drum 110 and acts as an outer layer. The drum ring 112 is in direct contact with the rollers 124. Motors are in direct contact with the drum ring 112, thereby enabling the rollers 124 to facilitate the rotation of the drum 110. In one embodiment, motors are placed at the ten o'clock and two o'clock positions of the drum ring 112 when viewing the drum 110 from the front. The drum 110 is operable to receive a concrete mix or similar mix. When the drum 110 rotates, it mixes the concrete or similar mix within the drum 110.

Pinch rollers 150 are located at the base and along the arms of the U-shaped cradle 120 to receive the drum ring 112 and facilitate smooth rotation of the drum 110. With respect to tilt mixers, pinch rollers 150 are needed to stabilize the load measurement system 100 because the cradle 120 is in a tilted state. The pinch rollers 150 may be positioned anterior (along the front side) or posterior (along the back side) to the drum 110.

The load measurement device 130 is operable to measure a material deformation, displacement, stress, strain, and/or vibration of the cradle 120 at one or more positions. The load measurement device 130 may include one or more sensors placed at positions on the cradle 120 to measure the cradle's 120 material deformation, displacement, stress, strain, or vibration. The load measurement device 130 may include a sensor located in a position to obtain a single measurement or two or more sensors located in positions where the cradle's 120 material deformation, displacement, stress, strain, and/or vibration would be more highly concentrated.

In various embodiments, the load measurement device 130 is operable to employ different sensing methods to determine the material deformation, displacement, stress, strain and/or the vibration of the cradle 120. For example, the load measurement device 130 may comprise position sensors (such as potentiometers, transducers, inductive proximity sensors), strain gauges, load cells, force sensors, ultrasonic microphones, fiber optic cables, acoustic strain gauges, springs, optical interferometers, accelerometers, and gyroscopes to measure the material deformation, stress, strain, or vibration of the cradle 120. The load measurement device 130 may determine material deformation, displacement, stress, strain and/or the vibration along a single axis (e.g., vertically, horizontally, or another desired angle) or along multiple axes.

Material deformation includes elongation, compression, bending, shearing, and twisting of the cradle 120. Material deformation of the cradle 120 is due to the stress the cradle 120 receives from the weight of the drum 110. This results in elongation, compression, bending, shearing, and twisting of the cradle 120, which varies depending on the weight of the drum 110, including the weight of the load of concrete in the drum 110. By comparing the position of the cradle 120 with the load of concrete in the drum 110 against the position of the cradle 120 with no load in the drum 110, the load measurement device 130 is operable to indirectly measure the amount of the load of concrete in the drum 110 based on the material deformation of the cradle 120.

In another embodiment, the load measurement device 130 may comprise optical displacement transducers, capacitive or inductive displacement transducers, acoustic displacement transducers, or optical interferometers to measure the displacement of the cradle 120. Displacement includes how much the cradle 120 has moved relative to a no-load position. Displacement of the cradle 120 is due to the stress the cradle 120 receives from the weight of the drum 110. This results in displacement, which varies depending on the weight of the drum 110, including the weight of the load of concrete in the drum 110. By comparing the position of the cradle 120 with the load of concrete in the drum 110 against the position of the cradle 120 with no load of concrete in the drum 110, the load measurement device 130 is operable to indirectly measure the weight of the load of concrete in the drum 110 based on the displacement of the cradle 120.

In another embodiment, the load measurement device 130 may comprise accelerometers, gyroscopes, or acoustics such as microphones to measure the vibration of the cradle 120. The load measurement device 130 is also operable to measure the vibration of the cradle 120 for time-varying deformation. The vibration of the cradle 120 varies depending on the weight of the drum 110, including the weight of the load of concrete in the drum 110. By comparing the vibration of the cradle 120 with the load of concrete in the drum 110 against the vibration of the cradle 120 with no load of concrete in the drum 110, the load measurement device 130 is operable to indirectly measure the weight of the load of concrete in the drum 110 based on the vibration of the cradle 120.

By determining the material deformation, displacement, stress, strain, or vibration of the cradle 120, it enables the load measurement system 100 to indirectly determine the amount of the load of concrete currently in the drum 110. The load measurement system 100 is further operable to determine the number of yards of concrete poured into the drum 110, currently in the drum 110, and poured out of the drum 110 by determining and analyzing the amount of concrete in the drum 110 at various times.

The load measurement system 100 is operable to determine the amount of symmetric or asymmetric load buildup in the drum 110. Buildup is concrete that is drying or has dried on the inside of the drum 110. Buildup results in the drum 110 being operable to mix less concrete mix. Buildup also results in damage to the drum 110, the drum ring 112, and the areas beneath the drum 110. Buildup (i.e., dried concrete) forces operators to operate the drum 110 at a diminished capacity because there is less volume in the drum 110 for wet concrete.

The shape of the drying or dried concrete in the drum 110 determines whether the buildup is classified as symmetric or asymmetric. The load measurement device 130 is operable to classify buildup as symmetric or asymmetric because symmetric buildup, unlike asymmetric buildup, has the identifying characteristic of being akin to measuring a dead load or a static weight on a scale. This is because symmetric buildup is concrete that is uniformly distributed along the axis of the drum's 110 rotation. For example, when concrete is stuck to the drum 100 in a symmetrically distributed state, the load measurement system 130 will report a DC offset or an increase in a measuring signal proportional to the static weight. For the same reasons, symmetric buildup does not vary with time or with drum 110 rotations.

In contrast, asymmetric buildup is concrete that is not uniformly distributed along the axis of the drum's 110 rotation. Stated differently, asymmetric buildup is dried concrete concentrated in a single location inside the drum 110, while symmetric buildup is dried concrete evenly distributed inside the drum 110. The load measurement device 130 is operable to classify buildup as symmetric or asymmetric because asymmetric buildup, unlike symmetric buildup, has the identifying characteristics of varying with time and being akin to an AC sine wave.

Asymmetric buildup is more damaging to a drum 110 than symmetric buildup because asymmetric buildup changes the center of gravity of the drum 110 due to the uneven distribution of dried concrete inside the drum 110. Asymmetric buildup also causes a reversal of tooth engagement between a mixing motor gear and a main drum gear, which creates a chattering effect. The load measurement device 130 is operable to detect the chattering effect as a time-varying effect and thus classify buildup as asymmetric.

Measuring and detecting buildup in the drum 110 can be used to predict damage to the drum, and thus prevent drum failures with corrective action. Preventing drum failures extends the operative life of the drum 110 because repairs/ maintenance can be performed on the drum 110 before otherwise critical or incurable defects occur.

In one embodiment, the load measurement system 100 employs a single measurement of material deformation from the load measurement device 130 (i.e., a measurement from only one gauge, cell, cable, interferometer, transducer, accelerometer, gyroscope, acoustic, or other sensor) to determine the amount of symmetric load buildup in the drum 110. The load measurement system 100 may also employ a single measurement of displacement from the load measurement device 130 to determine symmetric load buildup in the drum 110.

In another embodiment, the load measurement system 100 employs multiple measurements of material deformation from several load measurement devices 130 (i.e., measurements from more than one gauge, cell, cable, interferometer, transducer, accelerometer, gyroscope, acoustic, or other sensor) to determine the amount of symmetric load buildup in the drum 110. The load measurement system 100 may also employ multiple measurements of displacement from several load measurement devices 130 to determine symmetric load buildup in the drum 110.

The load measurement system 100 is further operable to determine the amount of asymmetric buildup in the drum 110.

In one embodiment, the load measurement system 100 employs multiple measurements from a single load measurement device 130 (i.e., only one gauge, cell, cable, interferometer, transducer, accelerometer, gyroscope, acoustic, or other sensor) over a period of time using a time-variation analysis (e.g., frequency, Fast Fourier Transform, or Discrete Fourier Transform analysis) to determine the amount of asymmetric load buildup in the drum 110.

The load measurement system 100 is operable to perform a frequency or similar analysis for any load measurement device 130 to determine the amount of asymmetric buildup currently in the drum 110. Based on the power/amplitudes of frequencies from a single load measurement device 130 over a period of time, the amount of asymmetric buildup currently in the drum 110 can be determined. By way of example, if the drum 110, without any buildup, rotates at a rate of one rotation per second, then there will be a frequency resembling a sine wave at 1 Hertz ("HZ"). If there is asymmetric buildup in the drum 110, then the amplitude/ power of the frequency from the single load measurement device 130 will be greater over time. The larger the amount of asymmetric buildup in the drum 110, the larger the amplitude/power of the frequency from the load measurement device 130.

In another embodiment, the load measurement system 100 employs measurements of material deformation or displacement from several load measurement devices 130 (i.e., measurements from more than one gauge, cell, cable, interferometer, transducer, accelerometer, gyroscope, acoustic, or other sensor) to determine asymmetric buildup in the drum 110. One advantage of employing multiple load measurement devices 130 to determine buildup in the drum 110 is that the load measurement system 100 is operable to determine the load buildup in the drum 110 without analyzing the amplitude/power of the frequency of the load measurement devices 130 over a period of time.

In one embodiment, the load measurement system 100 is operable to determine the amount of asymmetric buildup in the drum 110 using microphone data from a load measurement device 130 to detect and measure characteristic sounds created by asymmetric buildup.

In another embodiment, the load measurement system 100 is operable to employ machine learning algorithms, such as deep learning, to better predict drum failures based on measurements from the load measurement device 130.

The load measurement system 100 is operable to work with various mixers known and used in the industry, including tilt mixers, stationary mixers, construction vehicle mixers, and mounted construction vehicle mixers.

Figure 2:
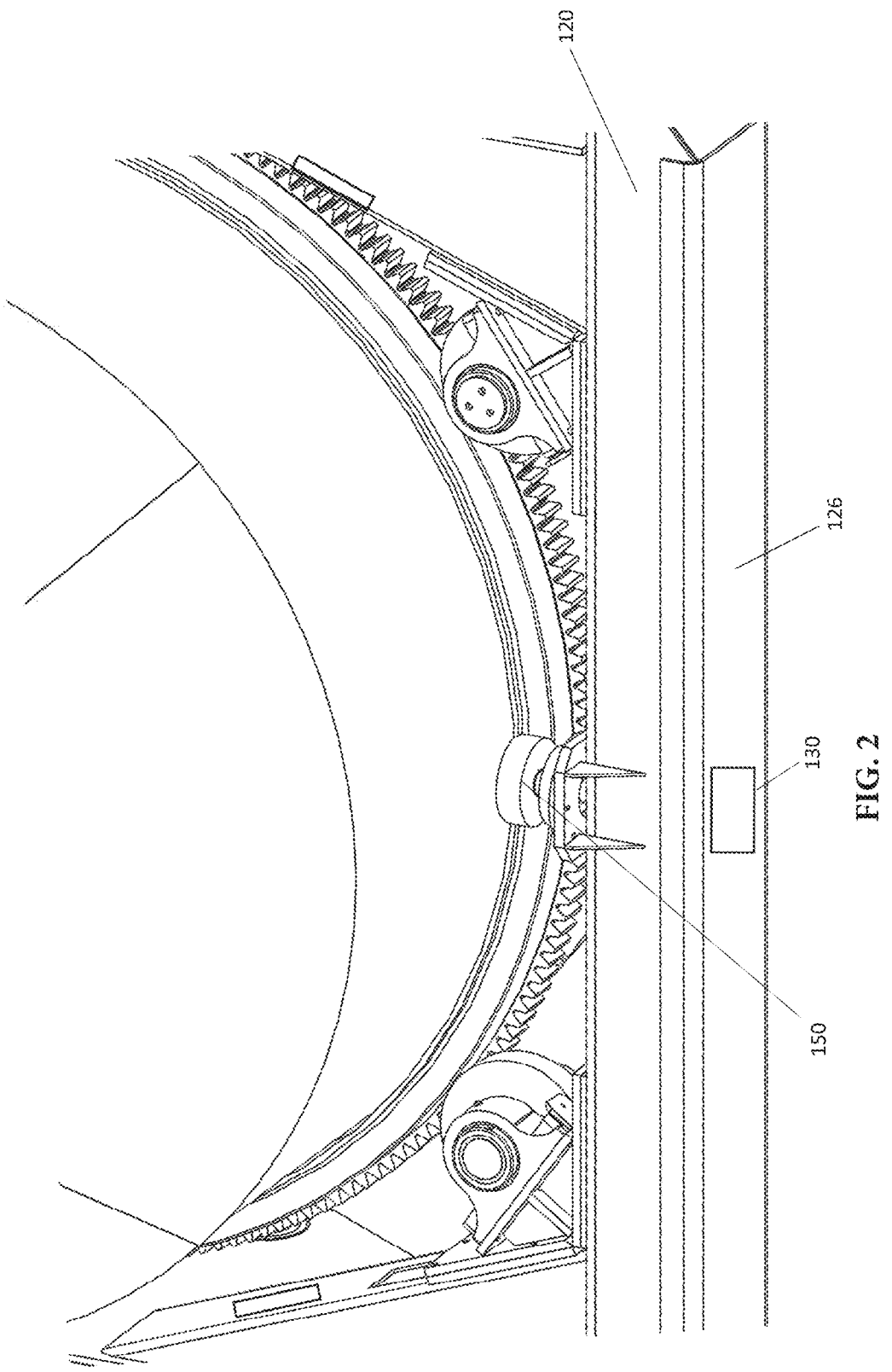
FIG. 2 illustrates preferred locations to measure a cradle's material deformation, displacement, and/or vibration using an embodiment of a load measurement device according to FIGS. 1A and 1B.

Referring to FIG. 2, preferred locations to measure the cradle's 120 material deformation, displacement, and/or vibration using an embodiment of a load measurement device 130 according to FIGS. 1A and 1B are illustrated.

In one embodiment, the load measurement device 130 may be placed horizontally, along the base 126 of the U-shaped cradle 120 to measure the material deformation of the cradle 120. The load measurement device 130 may also be placed at an angle (approximately 45 degrees) along the arms 128 of the U-shaped cradle 120 to measure the material deformation of the cradle 120.

In another embodiment, the load measurement device 130 may be placed horizontally, along the base 126 of the U-shaped cradle 120 to measure the displacement of the cradle 120. The load measurement device 130 may also be placed at an angle (approximately 45 degrees) along the arms 128 of the U-shaped cradle 120 to measure the displacement of the cradle 120.

In another embodiment, the load measurement device 130 may be placed horizontally, along the base 126 of the U-shaped cradle 120 to measure the vibration of the cradle 120. The load measurement device 130 may also be placed at an angle (approximately 45 degrees) along the arms 128 of the U-shaped cradle 120 to measure the vibration of the cradle 120. The load measurement device 130 may further be placed on a stationary frame adjacent to the cradle 120 to measure the vibration of the cradle 120.

Figure 3:
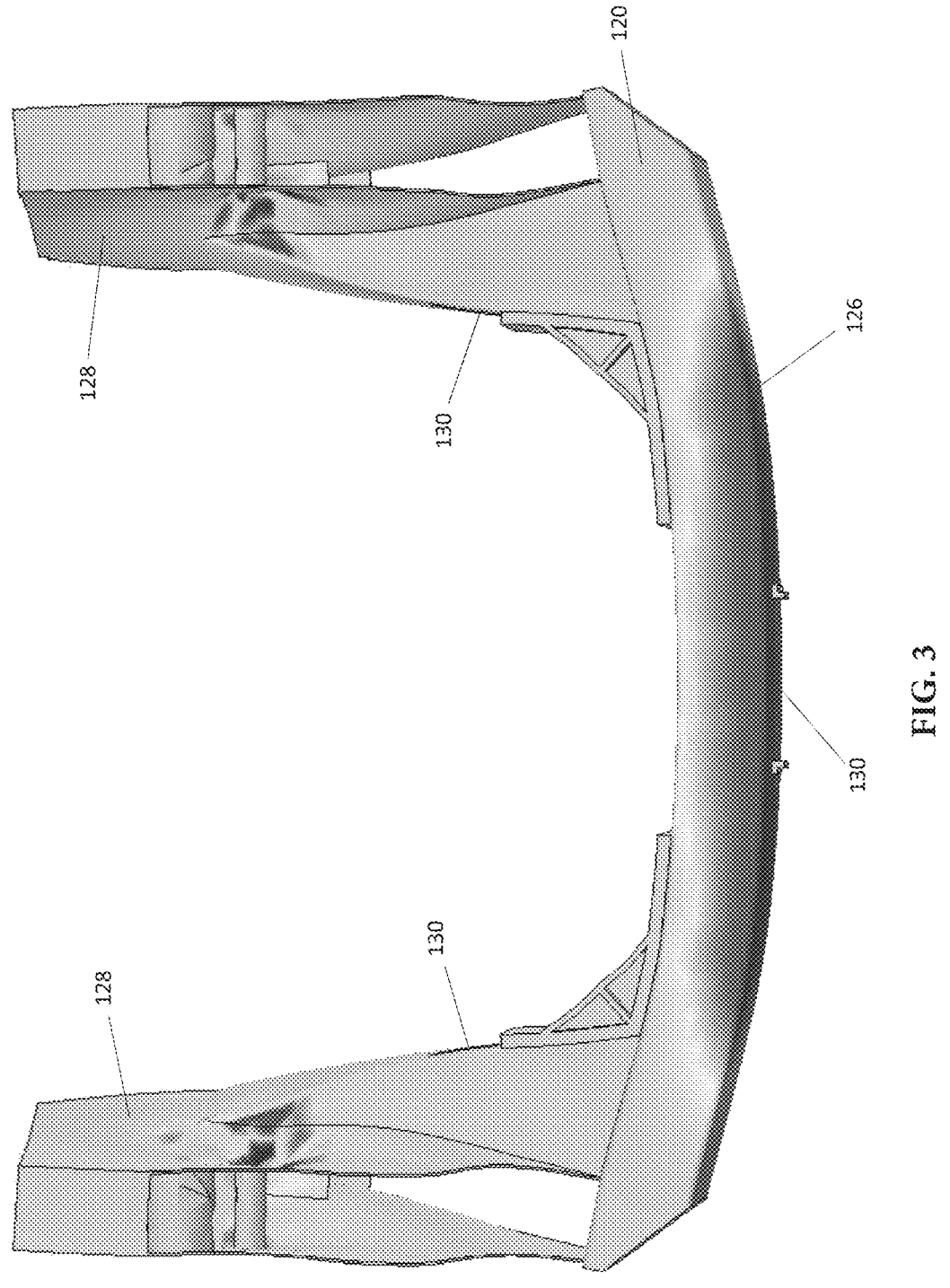
FIG. 3 illustrates strain in the horizontal direction exhibited by the cradle of an embodiment of a load measurement system according to FIGS. 1A and 1B.

Referring to FIG. 3, strain in the horizontal direction exhibited by the cradle 120 of an embodiment of a load measurement system 100 according to FIGS. 1A and 1B is illustrated. FIG. 3 demonstrates that the horizontal strain on the cradle 120 is significant at the base 126 and arms 128 of the cradle 120. In one embodiment, load measurement devices 130 may be placed at the base 126 and/or arms 128 of the cradle 120 to measure the cradle's 120 material deformation, displacement, and/or vibration.

Figure 4:
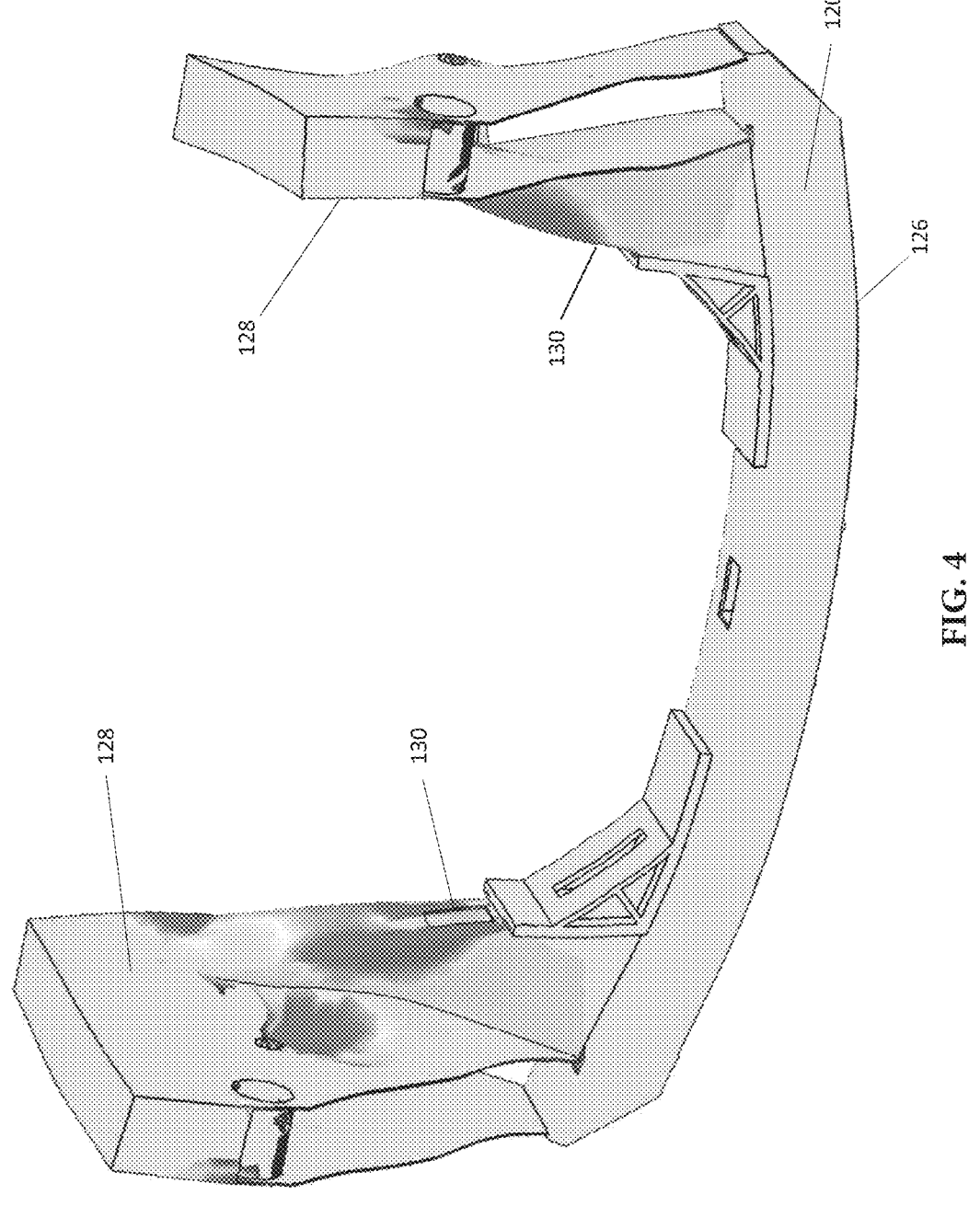
FIG. 4 illustrates strain in the vertical direction exhibited by the cradle of an embodiment of a load measurement system according to FIGS. 1A and 1B.

Referring to FIG. 4, strain in the vertical direction exhibited by the cradle 120 of an embodiment of a load measurement system 100 according to FIGS. 1A and 1B is illustrated. FIG. 4 demonstrates that the vertical strain on the cradle 120 is significant at and arms 128 of the cradle 120. In one embodiment, load measurement devices 130 may be placed at the arms 128 of the cradle 120 to measure the cradle's 120 material deformation, displacement, and/or vibration.

Referring to FIG. 5, a block diagram of a method for sending alerts based on the amount of concrete, symmetric concrete buildup, and asymmetric concrete buildup in the drum 110 is illustrated.

In step 510, the load measurement system 100 receives a material deformation, a displacement, or a vibration measurement from a load measurement device 130 adjacent to a cradle 120 receiving a mixing drum 110.

In step 520, the load measurement system 100 determines an amount of concrete in the mixing drum 110 based on the material deformity, the displacement, or the vibration measurement from the load measurement device 130.

In step 530, the load measurement system 100 determines an amount of symmetric concrete buildup in the mixing drum 110 based on the material deformity, the displacement, or the vibration measurement from the load measurement device 130.

In step 540, the load measurement system 100 determines an amount of asymmetric concrete in the mixing drum 110 based on the material deformity, the displacement, or the vibration measurement from the load measurement device 130.

In step 550, the load measurement system 100 sends an alert based on the amount of concrete, symmetric buildup, and asymmetric building in the mixing drum 110.

The load measurement system 100 may proceed from step 510 to step 520, step 530, or step 540 in any order. Depending on the type of alert a user desires to receive, the load measurement system 100 is operable to omit step 520, step 530, or step 540 as needed. By way of example, if a user only desires to know the amount of concrete in the mixing drum 110, then the load measurement system 100 would proceed from step 510, to step 520, and then to step 550—thereby skipping step 530 and step 540. The load measurement system 100 is similarly operable to only send alerts regarding the symmetric or asymmetric buildup in the mixing drum 110.

Sending alerts to remote devices (i.e., computers, tablets, smartphones, etc.) based on measurements from a load measurement device 130 is beneficial because it informs users of the amount of load of concrete currently in the drum 110, as well as the presence or amount of symmetric or asymmetric buildup in the drum 110. The alerts may also include information regarding suggested maintenance or repairs to the drum 110 so that corrective action can be taken to prevent drum failures, such as critical or incurable defects.

Figure 6:
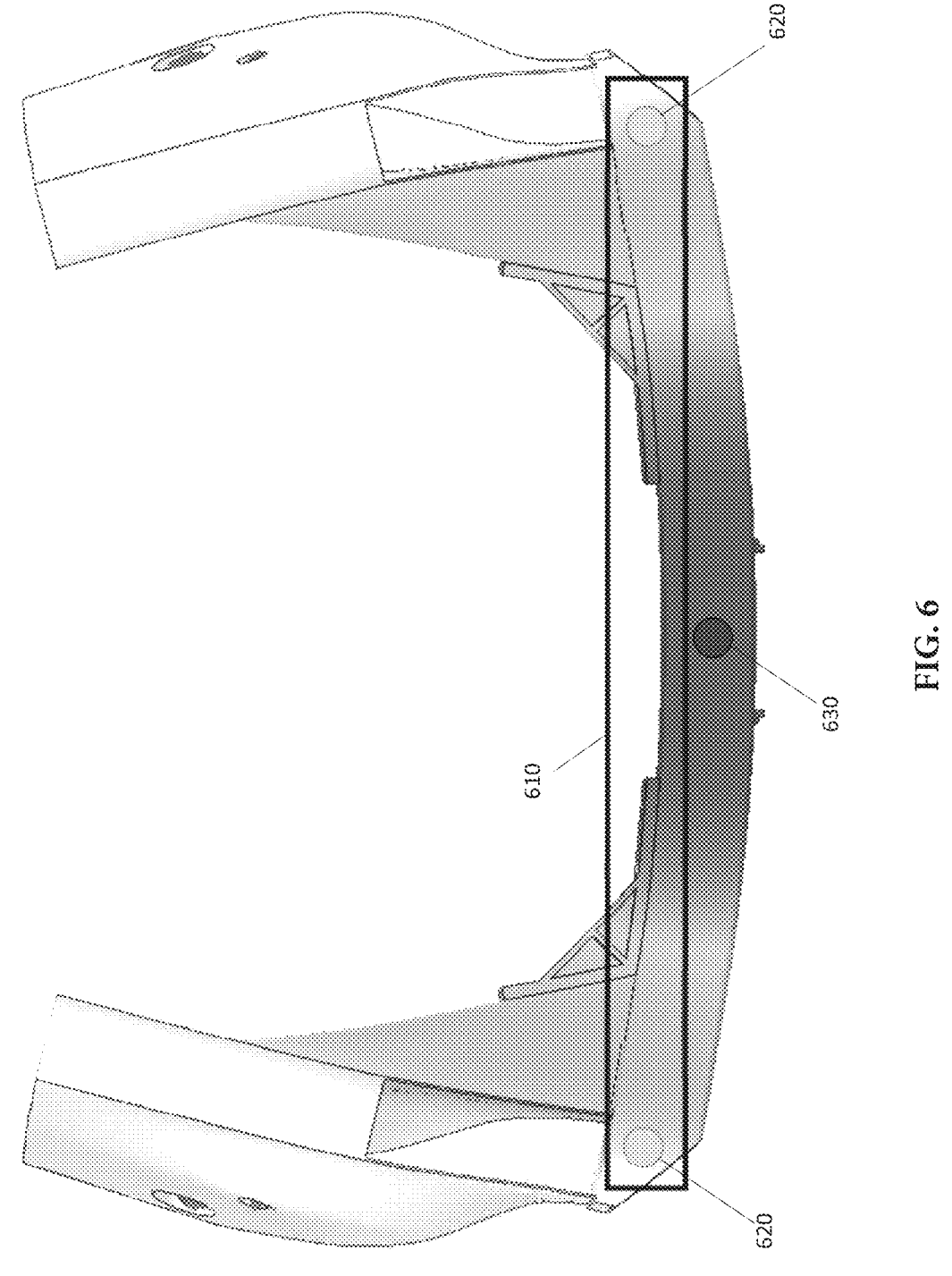
FIG. 6 illustrates strain in the vertical direction exhibited by the cradle of an embodiment of a load measurement system according to FIGS. 1A and 1B.

Referring to FIG. 6, strain in the vertical direction exhibited by the cradle 120 of an embodiment of a load measurement system 100 according to FIGS. 1A and 1B is illustrated. FIG. 6 demonstrates that displacement exhibited by the cradle 120 can be determined based on a difference/change in height (i.e., Y value) between a substantially horizontal reference beam 610, reference end pins 620, and/or a center pin 630. In one embodiment, a substantially horizontal reference beam 610 may be pinned to end pins 620 on the substantially U-shaped cradle 120. When the cradle 120 exhibits material deformation, such as bending or curving, the reference beam 610 remains in a substantially horizontal state. The load measurement system 100 is operable to measure the displacement of the cradle 120 based on the distance between the reference beam 610 and the cradle 120 after the cradle 120 exhibits material deformation.

In another embodiment, the load measurement system 100 is operable to measure the displacement of the cradle 120 based on the difference/change in height between the end pins 620 and the center pin 630. The center pin 630 will experience a greater change in height compared to the end pins 620 because the material deformation of the cradle 120, such as bending or curving, is greater at the center of the cradle 120 than at the end of the cradle 120. The pins 620, 630 may be welded or pinned (i.e., not welded) to the cradle 120. Welded pins provide long term reliability for measuring the displacement of the cradle 120.

Figure 7B:
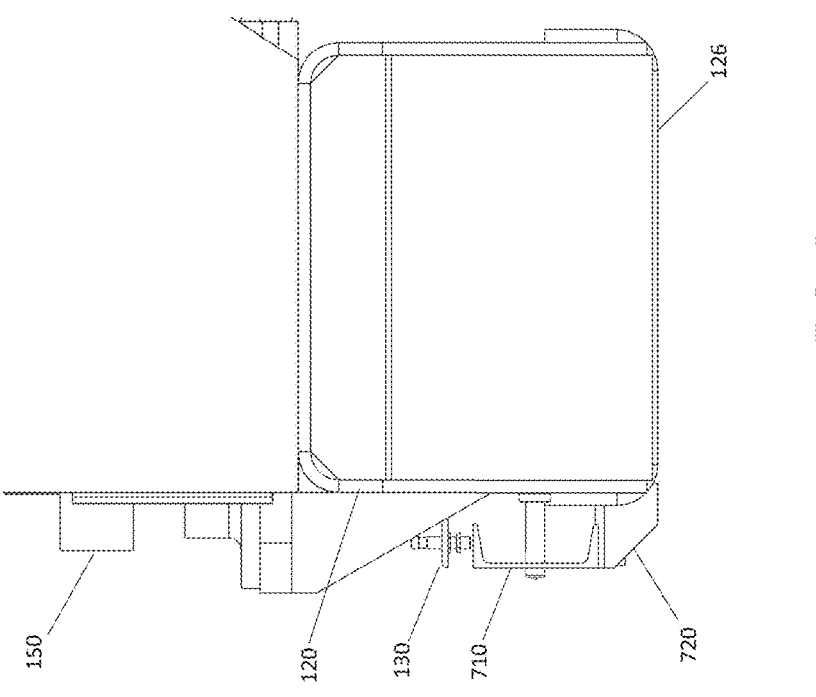
FIGS. 7A and 7B illustrate a perspective and side view of another embodiment of the load measurement system according to FIGS. 1A and 1B.
Figure 7A:
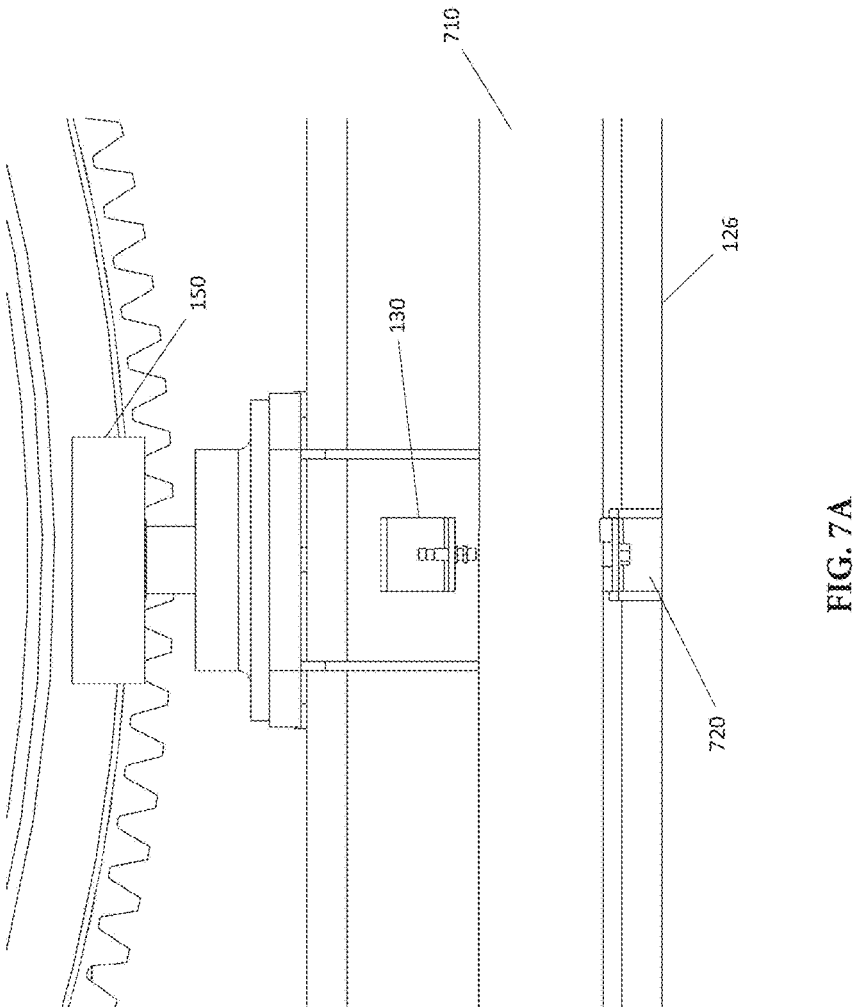

Referring to FIGS. 7A and 7B, a perspective and side view of an embodiment of a load measurement system according to FIG. 1 is illustrated. FIGS. 1A and 1B illustrate that the load measurement device 130 may be an inductive proximity sensor placed adjacent to the cradle 120 and above a structural channel 710 (also known as a C-channel or a parallel flange channel). The load measurement device 130 is operable to measure the displacement of the cradle 120 by comparing the position of the cradle 120 at rest against the position of the cradle 120 when exhibiting material deformation such as bending or curving. The load measurement device 130 may be adjoined above, below, adjacent to, or along the cradle 120 with the assistance of brackets or other securing means. The brackets or other securing means must employ a sufficient stiffness to resist flexing or bending relative to the cradle 120 when the cradle 120 exhibits material deformation in order for the load measurement device 130 to record accurate measurements.

In another embodiment, the load measurement system 100 includes a pad 720 operable to absorb non-cradle vibrations (i.e., interference), which facilitates the load measurement device 130 obtain accurate measurements. The non-cradle vibrations may include vibrations from the structural channel 710 while the drum 110 is in use, or vibrations from a user stepping on or near the structural channel 710. The pad 720 may be made of rubber or similar sound absorbing materials.

The above description is only to preferred embodiments of the present invention and it should be noted that those skilled in the art can make improvements and modifications without departing from the technical principles of the present invention and as such, variations are also considered to be the scope of protection of the present invention.

What is claimed is:

1. A mixer having a load measurement system comprising:
  a. a mixer including:
    a mixing drum configured to contain and mix concrete, and
    a cradle adjacent to the mixing drum and configured to receive the mixing drum; and
  b. a load measurement system including:
    at least one load measurement device disposed adjacent to the cradle and configured to measure changes to a material property of the cradle resulting from the force exerted by a load of concrete within the mixing drum,
    wherein the load measurement system determines an amount of load buildup within the mixing drum based on the change to the material property of the cradle.

2. The load measurement system of claim 1, wherein the load measurement device includes a sensor that measures the material deformation, displacement, stress, strain, or vibration of the cradle.

3. The load measurement system of claim 1, wherein the load measurement device is positioned on or around the midpoint of the cradle.

4. The load measurement system of claim 1, wherein the load measurement system includes two load measurement devices.

5. The load measurement system of claim 1, wherein the two load measurement devices are positioned on or around the two locations on the cradle where the stress exerted by the load within the mixing drum are most highly concentrated.

6. The mixer of claim 1, wherein the load measurement system determines the amount of symmetric load buildup within the mixing drum.

7. The mixer of claim 1, wherein the load measurement system determines the amount of asymmetric load buildup within the mixing drum.

8. A method for determining an amount of concrete currently in a mixer comprising the steps of:
  a. measuring a change to a material property of a cradle by a load measurement device positioned adjacent to a cradle, the cradle supporting a mixing drum within the mixer containing a load of concrete;
  b. determining an amount of load buildup within the mixing drum based on the measurement of the change to the material property from the load measurement device; and
  c. sending an alert to a remote based on the amount of the load within the mixing drum.

9. The method of claim 8, wherein the load measurement device measures the material deformation, displacement, stress, strain, or vibration of the cradle.

10. The method of claim 8, wherein determining an amount of load buildup within the mixing drum includes determining an amount of symmetric load buildup.

11. The mixer of claim 8, wherein determining an amount of load buildup within the mixing drum includes determining an amount of asymmetric load buildup.

12. A method for determining an amount of concrete buildup currently in a concrete mixing comprising the steps of:
  a. measuring a change to a material property of a cradle by a load measurement device positioned adjacent to a cradle, the cradle supporting a mixing drum within the mixer containing a load of concrete;
  b. determining an amount of concrete buildup in the mixing drum based on the measurement of the change in the material property of the cradle from the load measurement device;
  c. sending an alert to a remote device based on the amount of concrete buildup within the mixing drum.

13. The method of claim 12, wherein the load measurement device measures the material deformation, displacement, stress, strain, or vibration of the cradle.

14. The mixer of claim 12, wherein determining an amount of concrete buildup within the mixing drum includes determining an amount of asymmetric concrete buildup.

15. The method of claim 12, wherein determining an amount of concrete buildup within the mixing drum includes determining an amount of symmetric concrete buildup.

\*   \*   \*   \*   \*